United States Patent
Ueda et al.

(10) Patent No.: US 7,560,182 B2
(45) Date of Patent: Jul. 14, 2009

(54) REACTION GAS SUPPLY APPARATUS AND METHOD FOR FUEL CELL

(75) Inventors: Kenichiro Ueda, Utsunomiya (JP); Kuniaki Ojima, Yuki (JP); Shinji Yoshikawa, Utsunomiya (JP); Nobutaka Nakajima, Haga-gun (JP); Yoshikazu Murakami, Utsunomiya (JP); Yasunori Kotani, Utsunomiya (JP); Tatsuya Sugawara, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 695 days.

(21) Appl. No.: 10/993,715

(22) Filed: Nov. 19, 2004

(65) Prior Publication Data
US 2005/0118475 A1 Jun. 2, 2005

(30) Foreign Application Priority Data
Nov. 28, 2003 (JP) ............................. 2003-398918
May 7, 2004 (JP) ............................. 2004-138321

(51) Int. Cl.
*H01M 8/04* (2006.01)
(52) U.S. Cl. ............................. 429/13; 429/22; 429/25; 429/34
(58) Field of Classification Search ....................... None
See application file for complete search history.

(56) References Cited

U.S. PATENT DOCUMENTS 5,394,900 A * 3/1995 Okuyama et al. ........... 137/510

| | | | |
|---|---|---|---|
| 2002/0006537 A1* | 1/2002 | Kobayashi et al. | 429/26 |
| 2002/0022171 A1* | 2/2002 | Saito et al. | 429/34 |
| 2003/0012989 A1* | 1/2003 | Ueda et al. | 429/22 |
| 2003/0022043 A1* | 1/2003 | McElroy | 429/23 |

FOREIGN PATENT DOCUMENTS

JP 2002-373682 12/2002

* cited by examiner

*Primary Examiner*—Jonathan Crepeau
*Assistant Examiner*—Tony Chuo
(74) *Attorney, Agent, or Firm*—Lahive & Cockfield, LLP; Anthony A. Laurentano

(57) ABSTRACT

A reaction gas supply apparatus for a fuel cell is able to adapt to various kinds of operating states, and can provide improved responsiveness with respect to a required output. The apparatus has: a compressor 2 that supplies pressurized air to a cathode electrode of a fuel cell 1; a hydrogen supply device 30 that supplies hydrogen to an anode electrode of the fuel cell 1; a control device 10 that regulates the pressure of the cathode electrode by controlling the compressor 2 according to an operating state of the fuel cell 1; and a regulator 5 that is applied with the air pressure of the cathode electrode as a reference pressure, and regulates the supply pressure to the anode electrode based on this air pressure. Moreover there is provided a pressure regulator 39 that is capable of regulating the reference pressure that is applied to the regulator 5, by discharging air from an air flow passage for the air pressure that is applied to the regulator 5.

8 Claims, 9 Drawing Sheets

REACTION GAS SUPPLY APPARATUS AND METHOD FOR FUEL CELL

BACKGROUND OF THE INVENTION

1. Field of the Invention

Priority is claimed on Japanese Patent Applications Nos. 2003-398918 and 2004-138321, filed Nov. 28, 2003 and May 7, 2004, respectively, the contents of which are incorporated herein by reference.

The present invention relates to a reaction gas supply apparatus for a fuel cell, having a regulator to which is applied a cathode inlet pressure of the fuel cell as a reference pressure, to thereby regulate an anode supply pressure of the fuel cell. The present invention also relates to a reaction gas supply method for a fuel cell.

2. Description of Related Art

As an example of a fuel cell system mounted on a fuel cell powered vehicle, a system is known in which oxidant gas is supplied to a cathode electrode of the fuel cell while fuel gas is supplied to an anode electrode of the fuel cell, and power generation output is acquired from an electrochemical reaction of these gases.

Incidentally, when generating electricity using a fuel cell, a difference between pressures of the anode electrode and the cathode electrode (inter-electrode pressure difference) needs to be maintained within a constant range. Therefore, there is a system having a regulator to which is applied the cathode inlet pressure of the fuel cell as a reference pressure, to thereby regulate the anode supply pressure of the fuel cell. For example, in Japanese Patent Application Unexamined Publication No. 2002-373682, a technique is proposed in which the pressure applied to the cathode electrode is controlled by a control apparatus in order to be able to automatically regulate the pressure applied to the anode electrode through the regulator.

Incidentally, there are various operating states of a vehicle, such as a full load output state that delivers full load output, or an idle-stop state. The generated power that is required of a fuel cell fluctuates depending on the state of the vehicle, and the required pressure of the reaction gases also fluctuates accordingly. However, it is difficult to quickly control the anode pressure to an appropriate value (target value) for the cathode pressure over the total power generating range, simply by performing mechanical control using a regulator, so that there is a problem in terms of responsiveness. Also, the existing technology employs a mechanical valve as a regulator, and the anode electrode pressure is regulated in accordance with the response characteristic thereof. Therefore, in a transient state where the amount of gas required for power generation fluctuates, there has been a problem in that there is a delay in the response of the mechanical valve, so that the anode electrode pressure regulated by the regulator deviates from the target value, and control for regulating the pressure to the target value becomes difficult.

SUMMARY OF THE INVENTION

An object of the present invention is to provide a reaction gas supply apparatus for a fuel cell that is able to adapt to various kinds of operating states, and can provide improved responsiveness with respect to a required output.

In order to attain the above object, according to an aspect of the present invention, there is provided a reaction gas supply apparatus for a fuel cell comprising: a compressor that supplies pressurized air to a cathode electrode of a fuel cell; a hydrogen supply device that supplies hydrogen to an anode electrode of the fuel cell (for example, the high-pressure hydrogen tank 30 in the embodiment); a control device that controls the compressor according to an operating state of the fuel cell to regulate an air pressure of the cathode electrode (for example, the ECU 10 in the embodiment); and a regulator that is applied with the air pressure of the cathode electrode as a reference pressure, and regulates a supply pressure to the anode electrode based on the air pressure, and a pressure regulator (for example, the air injector 36 and the solenoid valve 50 in the embodiment) that is capable of regulating the reference pressure that is applied to the regulator, by discharging air from an air flow passage for the air pressure that is applied to the regulator.

According to the thus constructed reaction gas supply apparatus, even in the case where the operating state of the fuel cell fluctuates and the flow rate of air into the air flow passage suddenly rises as the air pressure of the fuel cell temporarily increases, the pressure of the gas that is supplied to the anode electrode of the fuel cell can be regulated (matched) to the target value by operating the pressure regulator and discharging air from the air flow passage, to thereby regulate the reference pressure to the appropriated value.

Preferably, in the reaction gas supply apparatus as mentioned above, the regulator regulates an outlet pressure with respect to an applied regulating pressure to a predetermined value, with an atmospheric pressure as a reference, and a feedforward control amount of an opening of the pressure regulator is calculated in accordance with the atmospheric pressure (for example, steps S24, S26 and S28 of the embodiment).

According to the thus constructed reaction gas supply apparatus, the regulator is able to regulate the outlet pressure to a predetermined value even in the case where the atmospheric pressure fluctuates, and the pressure of the gas that is supplied to the anode electrode of the fuel cell can be regulated (matched) to the target value, by calculating the feedforward control amount of the pressure regulator opening in accordance with the atmospheric pressure, and appropriately regulating the regulating pressure applied to the regulator.

Preferably, in the reaction gas supply apparatus as mentioned above, the hydrogen supply device comprises a circulation passage that supplies hydrogen discharged from the anode electrode back to the anode electrode through an ejector, and the ejector has a hydrogen supply passage whose diameter is switchable in multiple stages, and the feedforward control amount of the opening of the pressure regulator is calculated according to the diameter of the hydrogen supply passage of the ejector (for example, step 22 of the embodiment).

According to the thus constructed reaction gas supply apparatus, the amount of hydrogen that circulates through the ejector can be regulated to a proper amount by switching the diameter, and the pressure of the gas that is supplied to the anode electrode of the fuel cell can be regulated (matched) to the target value by calculating the feedforward control amount of the pressure regulator opening according to the diameter, and thereby appropriately regulating the regulating pressure applied to the regulator according to the switched diameter of the ejector.

Preferably, in the reaction gas supply apparatus as mentioned above, the feedback control amount of the pressure regulator opening is calculated according to an anode electrode target pressure, which is determined according to a target generated power of the fuel cell, and a detected anode electrode pressure (for example, step S32 and S34 of the embodiment).

According to the thus constructed reaction gas supply apparatus, the pressure of the gas that is supplied to the anode electrode of the fuel cell can be regulated (matched) to the target value, by appropriately regulating the regulating pressure applied to the regulator so that the detected anode electrode pressure substantially matches the anode electrode target pressure.

Preferably, in the reaction gas supply apparatus as mentioned above, an orifice (for example, the orifice 34 of the embodiment) is provided in the air flow passage on an upstream side of the pressure regulator and in proximity to the pressure regulator.

According to the thus constructed reaction gas supply apparatus, by providing the orifice on the upstream side of the pressure regulator in proximity to the pressure regulator, the amount of air inflow to the pressure regulator with respect to the amount of air discharged from the pressure regulator is suppressed, so that pressure regulation can be stabilized regardless of the length of the route of the air passage. Furthermore, the responsiveness of the pressure regulator with respect to fluctuations in the air amount can be improved.

Preferably, in the reaction gas supply apparatus as mentioned above, the pressure regulator is comprises a valve body (for example, the valve body 27 of the embodiment) that is capable of opening and closing a circulation opening (for example, the circulation opening 33 of the embodiment) that circulates the air to be supplied to the regulator, and the valve body is of a shape with a diameter reducing in a direction of closing the circulation opening.

According to the thus constructed reaction gas supply apparatus, since the valve body has a shape with the diameter reducing in the direction of closing the circulation opening, noise generated when the valve body moves in the closing direction of the circulation opening to block the circulation opening can be reduced, and also, by moving the valve body in the opening or closing direction of the circulation opening, the distance between the valve body and the circulation opening can be uniquely set. Therefore pressure regulation can be uniquely regulated, and pressure regulation can be carried out with high accuracy.

According to another aspect of the present invention, there is provided a reaction as supply method for a fuel cell comprising the steps of: supplying pressurized air to a cathode electrode of a fuel cell with a compressor; supplying hydrogen to an anode electrode of the fuel cell; controlling the compressor according to an operating state of the fuel cell to regulate an air pressure of the cathode electrode; applying a regulator with the air pressure of the cathode electrode as a reference pressure, and regulating a supply pressure to the anode electrode based on the air pressure using the regulator; and regulating the reference pressure that is applied to the regulator, by discharging air from an air flow passage for the air pressure that is applied to the regulator.

Preferably, in the reaction gas supply method as mentioned above, the regulating step of the supply pressure to the anode electrode comprises regulating an outlet pressure of the regulator with respect to an applied regulating pressure to a predetermined value, with an atmospheric pressure as a reference, and the regulating step of the reference pressure comprises feedforward controlling an amount of air which is discharged from the air flow passage in accordance with the atmospheric pressure.

Preferably, in the reaction gas supply method as mentioned above, the supplying step of hydrogen comprises circulating hydrogen discharged from the anode electrode back to the anode electrode through an ejector, the ejector having a hydrogen supply passage whose diameter is switchable in multiple stages, and the regulating step of the reference pressure comprises feedforward controlling an amount of air which is discharged from the air flow passage according to the diameter of the hydrogen supply passage of the ejector.

Preferably, in the reaction gas supply method as mentioned above, the regulating step of the reference pressure comprises feedforward controlling an amount of air which is discharged from the air flow passage according to an anode electrode target pressure, which is determined according to a target generated power of the fuel cell, and a detected anode electrode pressure.

Preferably, in the reaction gas supply method as mentioned above, the regulating step of the reference pressure comprises using a pressure regulator for discharging air from the air flow passage, and the air flow passage has an orifice on an upstream side of the pressure regulator and in proximity to the pressure regulator.

Preferably, in the reaction gas supply method as mentioned above, the regulating step of the reference pressure comprises using a pressure regulator for discharging air from the air flow passage, the pressure regulator comprising a valve body that is capable of opening and closing a circulation opening that circulates the air to be supplied to the regulator, the valve body being of a shape with a diameter reducing in a direction of closing the circulation opening.

DETAILED DESCRIPTION OF THE INVENTION

Hereunder, an embodiment of a reaction gas supply apparatus for a fuel cell according to the present invention is described with reference to the drawings.

Figure 1:
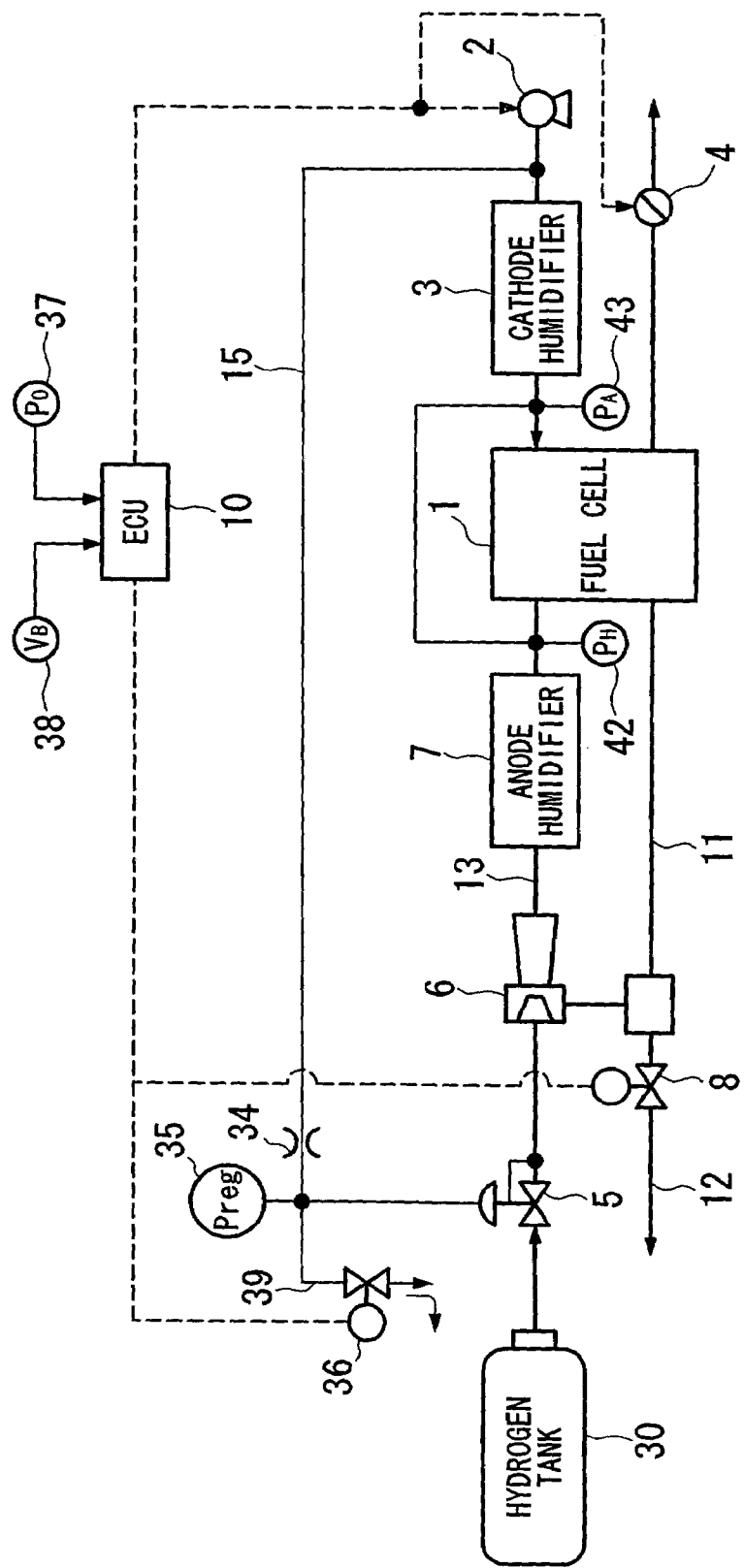
FIG. 1 is a block diagram of a reaction gas supply apparatus for a fuel cell of a first embodiment of the present invention.

FIG. 1 is a block diagram showing the construction of a reaction gas supply apparatus for a fuel cell of an embodiment of the present invention. A fuel cell 1 is constructed from a number of laminated layers of cells having an anode electrode and a cathode electrode provided on both sides of a solid polymer electrolyte membrane, and gas passages for supplying reaction gas provided on the outside of each electrode.

In this fuel cell 1, hydrogen gas is supplied to the anode electrode as fuel gas and air is supplied to the cathode electrode as oxidant gas to perform power generation.

Air is pressurized by an air compressor 2, then humidified by a cathode humidifier 3 and supplied to the cathode electrode of the fuel cell 1. Then after the oxygen in this air has been supplied as an oxidant, the air is discharged from the fuel cell 1 as air off-gas, and is discharged into the atmosphere through a pressure control valve 4. An ECU 10 drives the air compressor 2 to supply a predetermined amount of air to the fuel cell 1 according to the output required by the fuel cell 1 (hereafter referred to as required output), and controls the pressure control valve 4 to regulate the supply pressure of the air on the cathode electrode to a pressure corresponding to the required output of the fuel cell 1.

Meanwhile, after the hydrogen gas discharged from a high-pressure hydrogen tank 30 has been depressurized by a regulator 5, it then passes through an ejector 6 and is humidified by an anode humidifier 7 and supplied to the anode electrode of the fuel cell 1. After being supplied for power generation, this hydrogen gas is discharged from the fuel cell 1 as hydrogen off-gas and is drawn into the ejector 6 through a return passage 11, and is combined with the hydrogen gas supplied from the high-pressure hydrogen tank, and is again supplied and circulated to the fuel cell 1.

The regulator 5 comprises for example a pneumatic type proportional pressure control valve (see FIG. 2), and the pressure of the air supplied by the air compressor 2 is input as a signal pressure through an air signal introduction passage 15, and the pressure of the hydrogen gas at the outlet of the regulator 5 is depressurization controlled so as to become within a predetermined pressure range corresponding to the signal pressure. In the present embodiment, the pressure at the outlet of the regulator 5 is controlled to be a predetermined multiple of the signal pressure (for example, a multiple of 3) with the atmospheric pressure as a reference.

Figure 2:
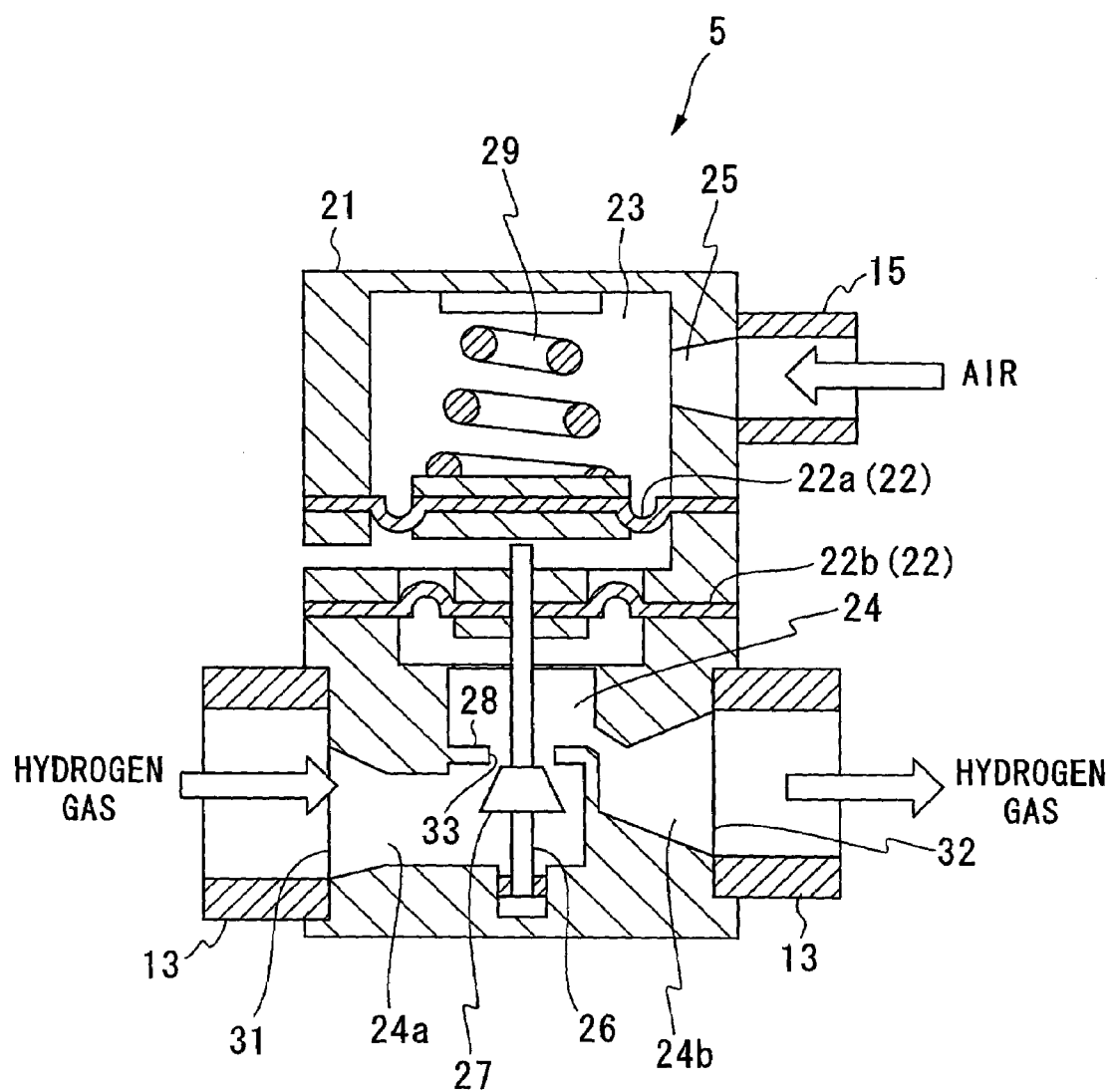
FIG. 2 is a cross-sectional view of a regulator shown in FIG. 1.

This regulator 5 is described with reference to the schematic cross-sectional view of FIG. 2.

An internal space of a body 21 of the regulator 5 is divided into top and bottom by pressure regulating diaphragms 22a and 22b (22). The space above the diaphragm 22a is a signal pressure chamber 23, and the space below the diaphragm 22b is a hydrogen gas passage 24. The signal pressure chamber 23 is an enclosed space provided with an air introduction opening 25. The air pressurized by the compressor 2 passes via an air signal introduction passage 15 from the air introduction opening 25 and into the signal pressure compartment 23.

A stem 26 is attached to the bottom face of the diaphragm 22b. The stem 26 is provided with a valve body 27 that can be seated and separated from above with respect to a valve seat part 28 in the hydrogen gas passage 24. Moreover, a bias setting spring 29 (elastic body) that urges the valve body 27 in the direction away from the valve seat 28 is provided in the signal pressure compartment 23.

Furthermore, the body 21 is provided with a hydrogen gas inlet 31 that communicates with a hydrogen passage 24a on the side where the valve body 27 is disposed, and a hydrogen gas outlet 32 that communicates with a hydrogen passage 24b on the side where the valve body 27 is not disposed. The hydrogen gas inlet 31 and the hydrogen gas outlet 32 are connected to a hydrogen supply pipe 13.

In the regulator 5 constructed this way, a downward force acts on the diaphragms 22a and 22b when a first driving force acting downward is greater than a second driving force acting upward, so that the valve body 27 is pushed in the direction away from the valve seat part 28 (that is, the valve opening direction). As a result, a circulation opening 33 formed on the valve seat part 28 is released from the valve body 27 so that hydrogen gas circulating through the hydrogen supply pipe 13 can circulate inside the regulator 5. On the other hand, an upward force is applied to the diaphragm 22 when the second driving force becomes greater than the first driving force, so that the valve body 27 is pushed in the direction towards the valve seat part 28 (that is, the valve closing direction). As a result, the circulation opening 33 formed on the valve seat part 28 is shut by the valve body 27 so that hydrogen gas circulating through the hydrogen supply pipe 13 cannot circulate inside the regulator 5.

Moreover, the diameter of the hydrogen supply passage of the ejector 6 switches in multiple stages. More specifically, by sliding a slide member provided with a plurality of nozzles of different diameters, one of the nozzles is connected to the hydrogen gas supply passage. Thus, the flow rate of the gas (hydrogen gas in this case) supplied to the ejector 6 is controlled.

Furthermore, the air signal introduction passage 15 connected to the regulator 5 is provided with an orifice 34 and a regulator pressure sensor 35 on the upstream side of the regulator 5. An air flow passage 39 branches on the downstream side of the orifice 34 and the regulator pressure sensor 35, and an air injector 36 is provided in this air flow passage 39.

Also, the ECU 10 is connected to: a battery voltage sensor 38 that detects the voltage of a battery (not shown in the diagram), an atmospheric pressure sensor 37, an anode inlet pressure sensor 42, a cathode inlet pressure sensor 43, and the regulator pressure sensor 35, and regulates the opening of the air injector 36 according to the values detected by these sensors.

Furthermore, the hydrogen off-gas return passage 11 is connected to the hydrogen off-gas discharge passage 12 via a solenoid actuator type purge valve 8. This purge valve 8 operates to drain water and the like, in order to prevent water from accumulating in the anode electrode side of the fuel cell 1.

The inlet gas pressure of the fuel cell 1 is controlled to a target value as described below. That is to say, in order to make the anode inlet pressure (the pressure detected by the anode inlet pressure sensor 42) the target value, the outlet pressure of the regulator 5 is set in consideration of the pressure loss at the ejector 6. If as with the present embodiment, the ejector 6 is a multiple stage type (a type in which the diameter of the nozzle can be switched), correction is performed in consideration of the pressure loss corresponding to the switched diameter. Furthermore, the signal pressure of the regulator 5 (pilot pressure PREG) is set corresponding to the characteristic of the regulator 5, and the amount of air discharged from the air injector 36 is regulated so that the actual pilot pressure PREG of the regulator 5 becomes the regulated pressure.

Figure 3:
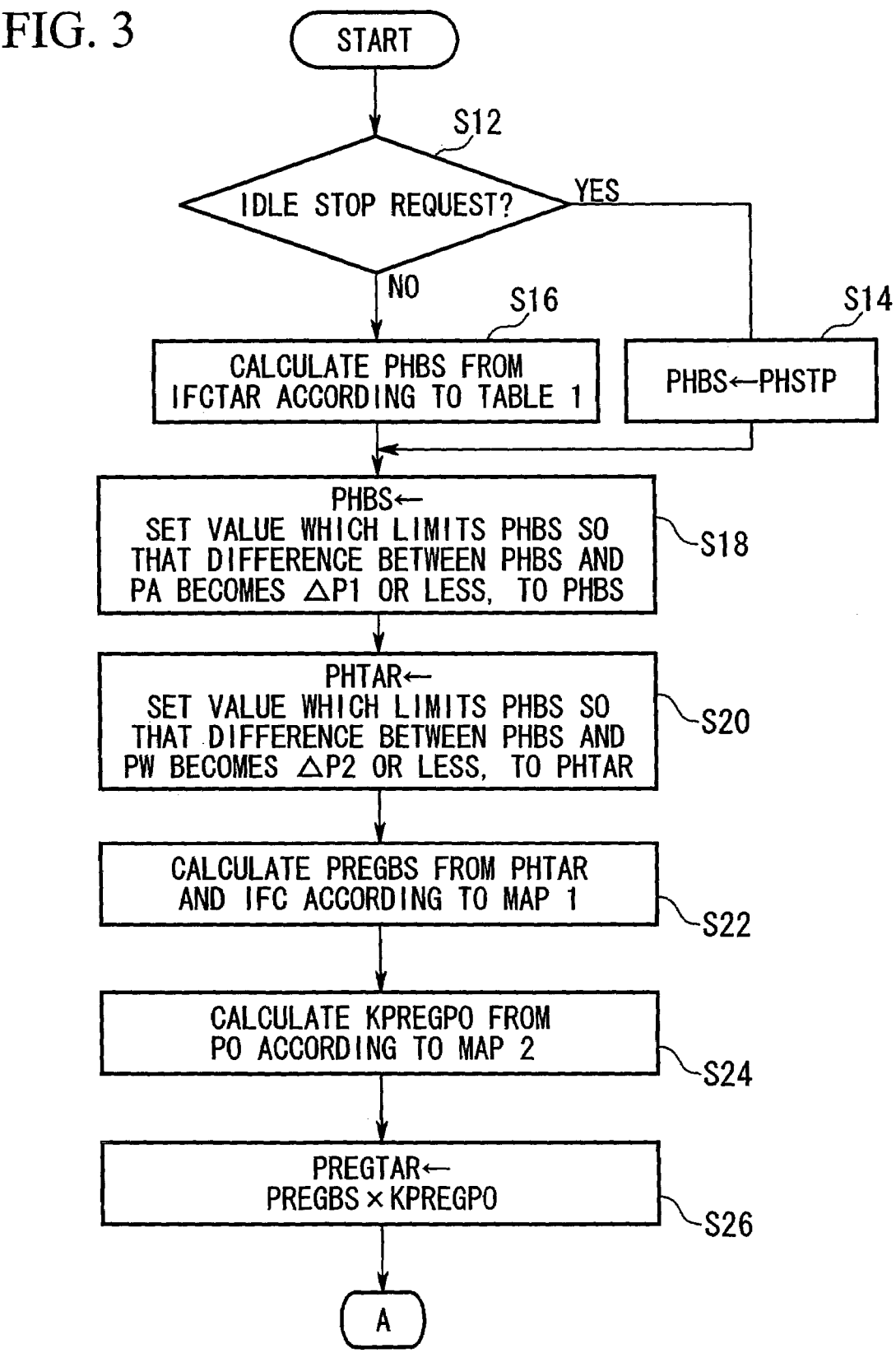
FIG. 3 is a flow chart showing an operation of the reaction gas supply apparatus for a fuel cell shown in FIG. 1.
Figure 4:
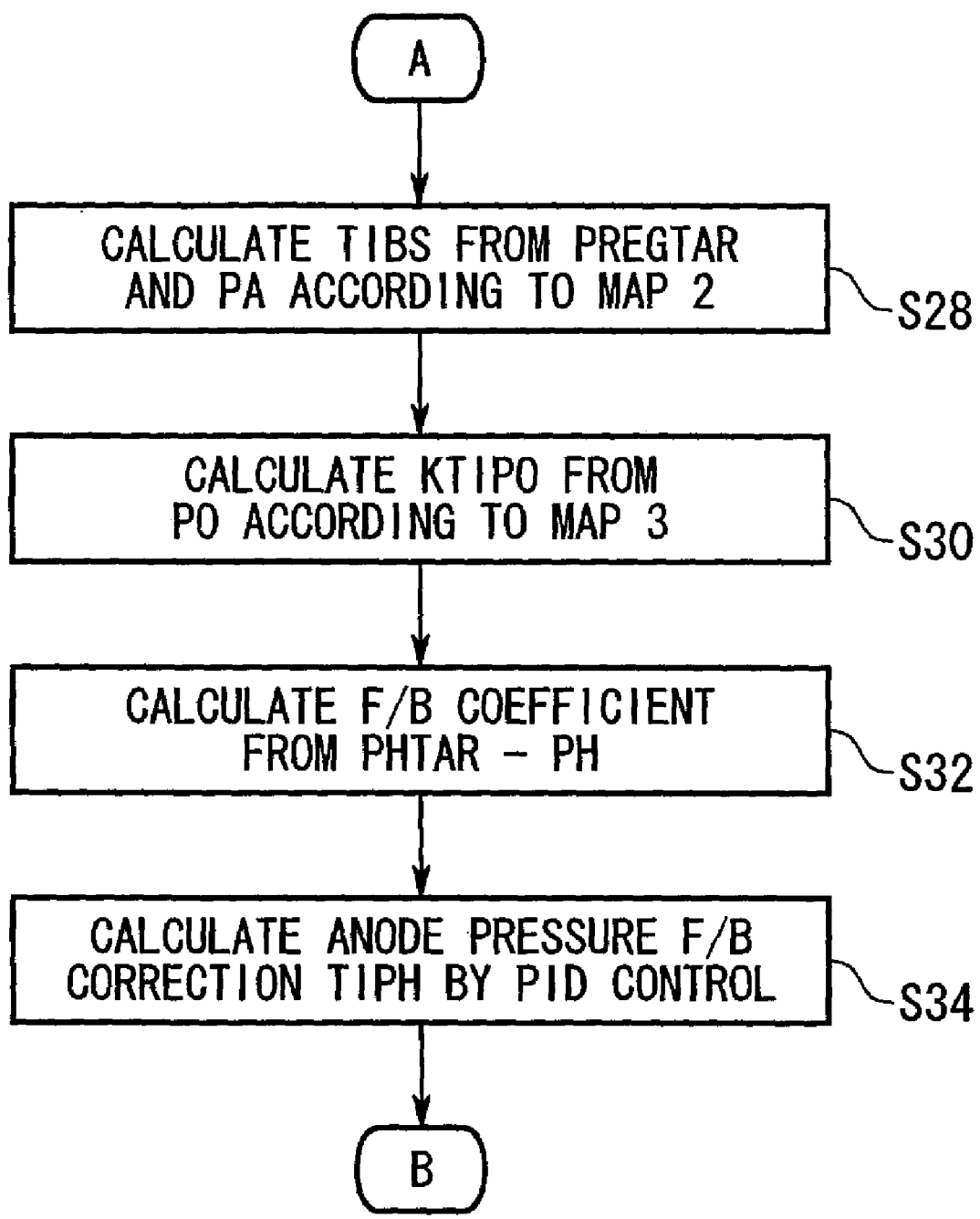
FIG. 4 is a flow chart showing the operation of the reaction gas supply apparatus for a fuel cell shown in FIG. 1.
Figure 5:
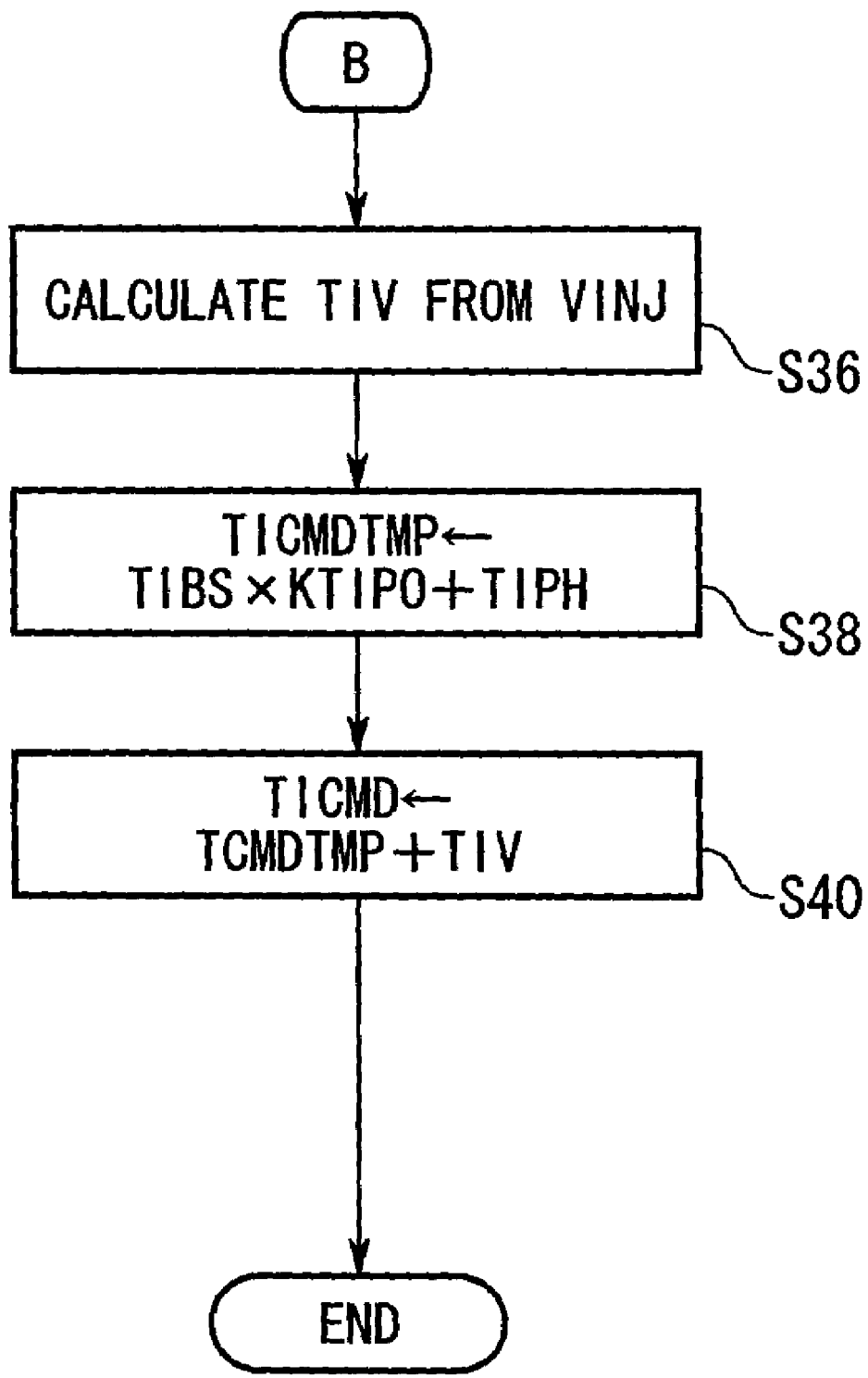
FIG. 5 is a flow chart showing the operation of the reaction gas supply apparatus for a fuel cell shown in FIG. 1.

The operation of the reaction gas supply apparatus for a fuel cell constructed as described above will be described. FIG. 3 to FIG. 5 are flow charts showing the operation of the reaction gas supply apparatus.

At first in step S12, it is determined whether or not an idle stop request is present, in other words, it is determined whether or not there is a stop request for the compressor 2 when the vehicle is in the idle state and power generation is not required. When the determination is YES the flow proceeds to step S14, while when the determination is NO the flow proceeds to step S16.

In step S14, a hydrogen pressure reference value PHBS is set to an idle-stop value PHSTP, and the flow proceeds to step S18. Thus, at the time of idle stop, the hydrogen pressure reference value PHSTP is changed to a special value.

Figure 6:
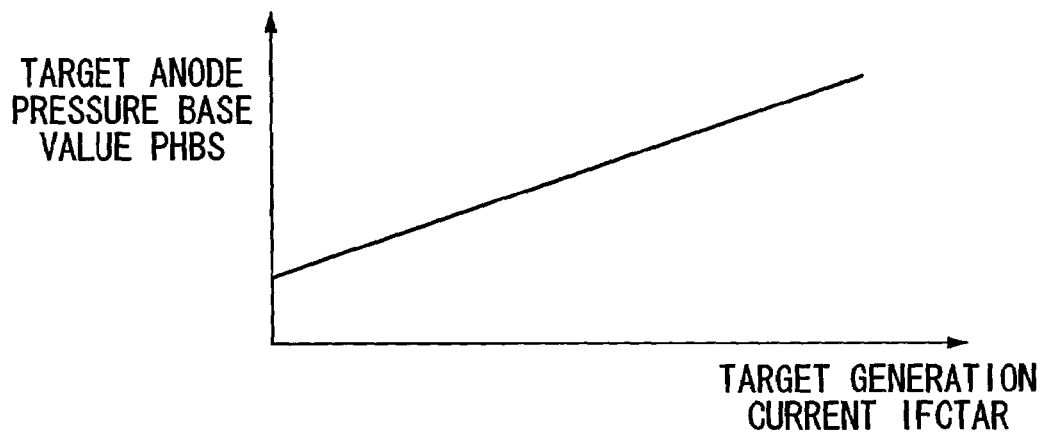
FIG. 6 is a graph showing a correlation between target generation current and target anode pressure base value.

On the other hand, in step S16, a target anode pressure base value PHBS is calculated from the target generation current IFCTAR according to Table 1 (see FIG. 6). FIG. 6 is a graph showing the correlation between the target generation current and the target anode pressure base value PHBS. As shown in the graph, in order to improve electricity generation performance, the target anode pressure base value PHBS is set to rise as the target generation current IFCTAR rises.

In step S18, the target anode pressure base value PHBS is regulated (limited) so that the difference between the target anode pressure base value PHBS and a cathode pressure value PA that is actually detected is a reference range $\Delta P1$ or less, and this value is newly set to the target anode pressure base value PHBS.

In step S20, the target anode pressure base value PHBS is regulated (limited) so that the difference between the target anode pressure base value PHBS and a cooling water pressure value PW is $\Delta P2$ or less, and this value is newly set to the target anode pressure PHTAR.

By performing the processing of steps S18 and S20, the solid polymer electrolyte membrane of the fuel cell 1 is protected from fluctuations of the inter-electrode pressure difference.

Figure 7:
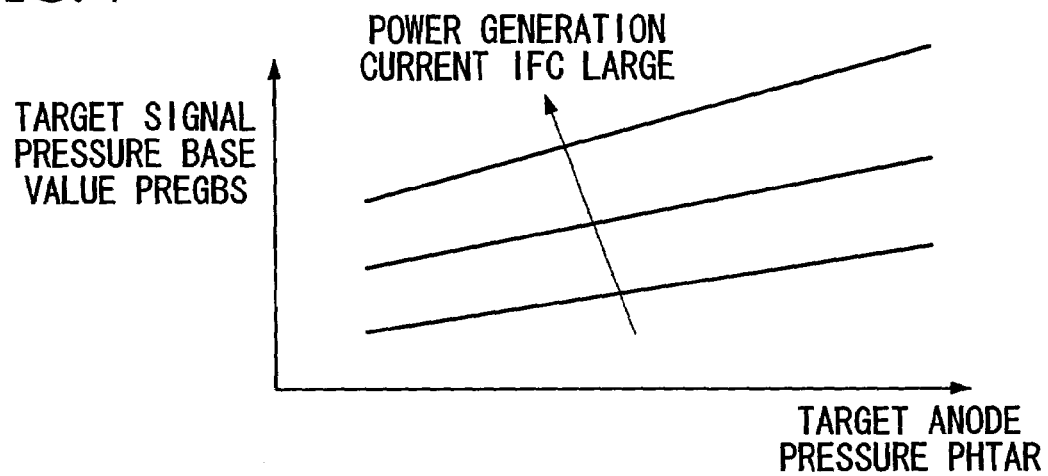
FIG. 7 is a graph showing a correlation between target anode pressure, target signal pressure base value, and generation current.

In step S22, a target signal pressure base value PREGBS is calculated from the target anode pressure PHTAR obtained in step S20 and the power generation current IFC, according to map 1 (see FIG. 7). FIG. 7 is a graph showing the correlation between the target anode pressure PHTAR, the target signal pressure base value PREGBS and the generation current IFC. As shown in the graph, as the target anode pressure PHTAR rises, the target signal pressure base value PREGBS also rises. Furthermore, as the power generation current IFC rises, the target signal pressure base value PREGBS with respect to the target anode pressure PHTAR also rises. This kind of correlation is established because the target signal pressure base value is set in consideration of the pressure loss of the ejector 6 according to the power generation current.

In the present embodiment, the diameter of the nozzle (not shown in the diagram) of the ejector 6 is switched according to the operating state (state of power generation). That is to say, it is switched to a nozzle of greater diameter as the power generation current rises. The aforementioned map 1 is a map for one diameter among the diameters of the ejector 6 which are switched in multiple stages, and maps corresponding to each of the diameters of the ejector 6 are provided. By so doing in this way, even if the diameter of the ejector 6 is switched and the pressure loss of the anode pressure changes as a result, an appropriate control can be performed in consideration of the fluctuation of this pressure loss.

Figure 8:
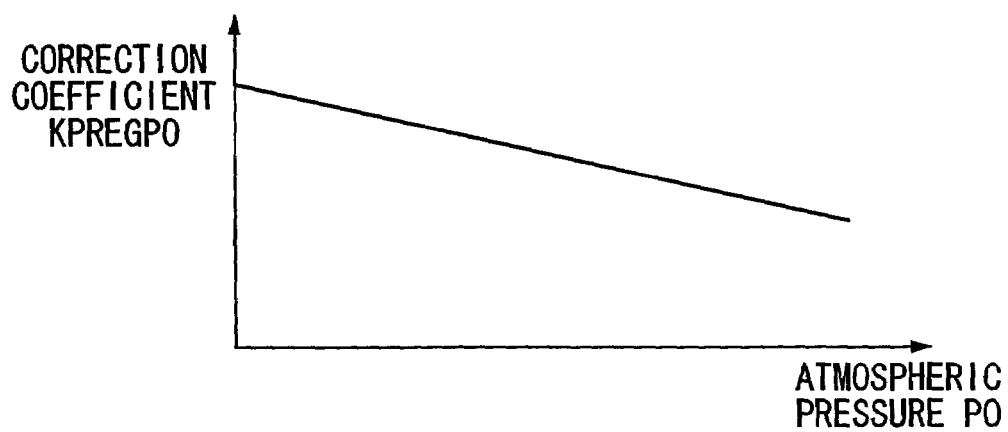
FIG. 8 is a graph showing a correlation between atmospheric pressure and a correction coefficient.

In step S24, a correction coefficient KPREGPO is calculated with the atmospheric pressure PO as a reference according to Table 2 (see FIG. 8). FIG. 8 is a graph showing the correlation between the atmospheric pressure PO and the correction coefficient KPREGPO. As shown in the graph, this is set so that the correction coefficient KPREGPO becomes higher at high altitude where the atmospheric pressure PO is low, and the correction coefficient KPREGPO becomes lower at low altitude where the atmospheric pressure PO is high.

In step S26, the value of the correction coefficient KPREGPO multiplied by the target signal pressure base value PREGBS, is set as a target pressure PREGTAR for the inlet of the regulator 5.

The regulator 5 is a regulating valve having a function that regulates the outlet pressure to a predetermined value with the atmospheric pressure PO as a reference. However the target value of the anode inlet pressure of the fuel cell 1 is set on the basis of absolute pressure.

Therefore, by changing the target pressure PREGTAR in consideration of the atmospheric pressure fluctuation, even if the atmospheric pressure decreases, the inlet pressure (absolute pressure) at the anode electrode can be regulated to the target value, by appropriately regulating the regulating pressure that is applied to the regulator 5.

Figure 9:
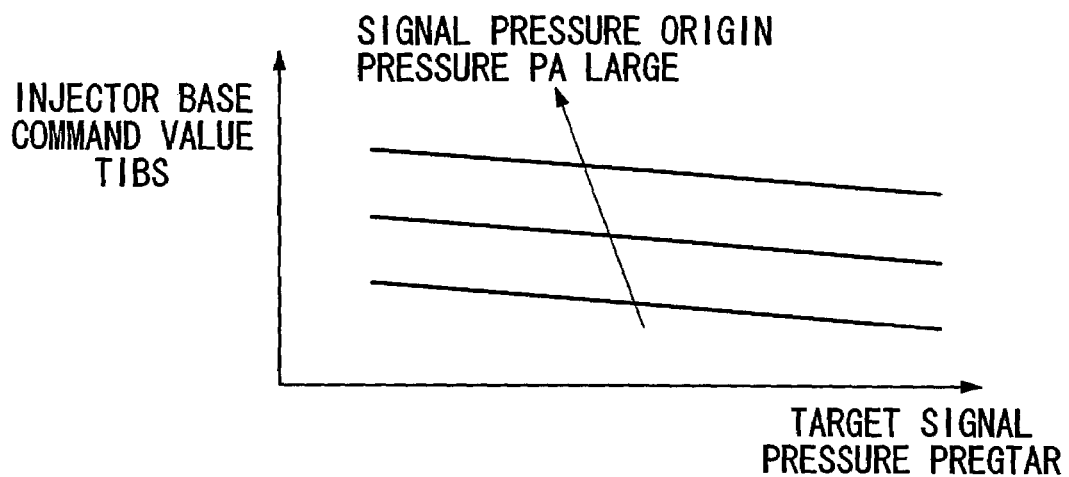
FIG. 9 is a graph showing a correlation between target signal pressure, injector base command value, and signal origin pressure.

In step S28, an injector base command value TIBS is calculated from the target signal pressure PREGTAR and the signal origin pressure (cathode pressure) PA according to map 2 (see FIG. 9). FIG. 9 is a graph showing the correlation between the target signal pressure PREGTAR, the injector base command value TIBS, and the signal origin pressure PA. As shown in the graph, the injector base command value TIBS and the target signal pressure PREGTAR are inversely proportional. Moreover, the greater the signal pressure origin pressure PA, the greater the injector base command value TIBS with respect to the target signal pressure PREGTAR. The command value TIBS calculated in this way is an open valve time for each unit period (for example, 30 msec) of the injector 36.

Figure 10:
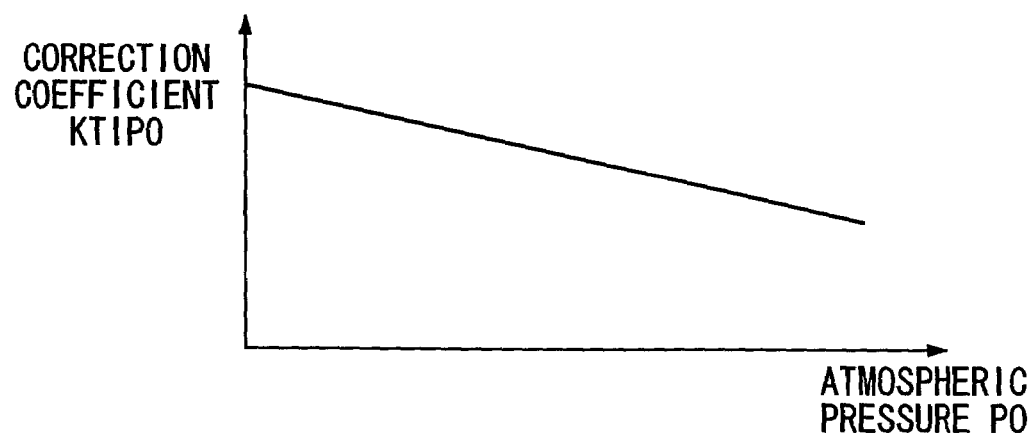
FIG. 10 is a graph showing a correlation between atmospheric pressure and a correction coefficient.

In step S30, a correction coefficient KTIPO is calculated from the atmospheric pressure PO according to Table 3 (see FIG. 10). FIG. 10 is a graph showing the correlation between the atmospheric pressure PO and the correction coefficient KTIPO. As shown in the graph, this is set so that the correction coefficient KTIPO becomes higher at high altitude where the atmospheric pressure PO is low, and the correction coefficient KTIPO becomes lower at low altitude where the atmospheric pressure PO is high.

In step S32, a feedback coefficient is calculated from the difference between the target anode pressure PHTAR and the actual anode pressure PH that is detected by the anode inlet pressure sensor 42. In step S34, the anode pressure feedback correction amount TIPH is calculated by PID control.

By performing the processing of these steps S32 and S34, feedback control of the anode inlet pressure can be performed.

By performing feedback control in this way, the regulating pressure that is applied to the regulator 5 can be appropriately regulated so that the detected anode inlet pressure PH substantially matches the target anode pressure PHTAR.

Furthermore, as the feedback control, instead of the control of steps S32 and S34, the feedback coefficient may be calculated from the difference between the target signal pressure and the actual signal pressure, and then the anode pressure feedback correction amount TIPH may be calculated by PID control.

In step S36, invalid time TIV is calculated from the voltage VINJ that is detected by the battery voltage sensor 38. As a result, even when the lift amount of the valve body of the injector 36 fluctuates according to the voltage of the battery, appropriate control can be performed.

In step S38, a feedforward base value TICMDTMP is acquired by multiplying the base value TIBS by the correction coefficient KTIPO, and adding the correction value TIPH to the value.

As a result, the base value TIBS of the feedback control amount can be set to an appropriate value according to the atmospheric pressure.

Then, in step S40, an injector command value TICMD is calculated by adding the invalid time TIV to TICMDTMP.

By so doing, the reference pressure with respect to the regulator 5 can be regulated to an appropriate value, and the responsiveness with respect to the required output can be improved.

Figure 11:
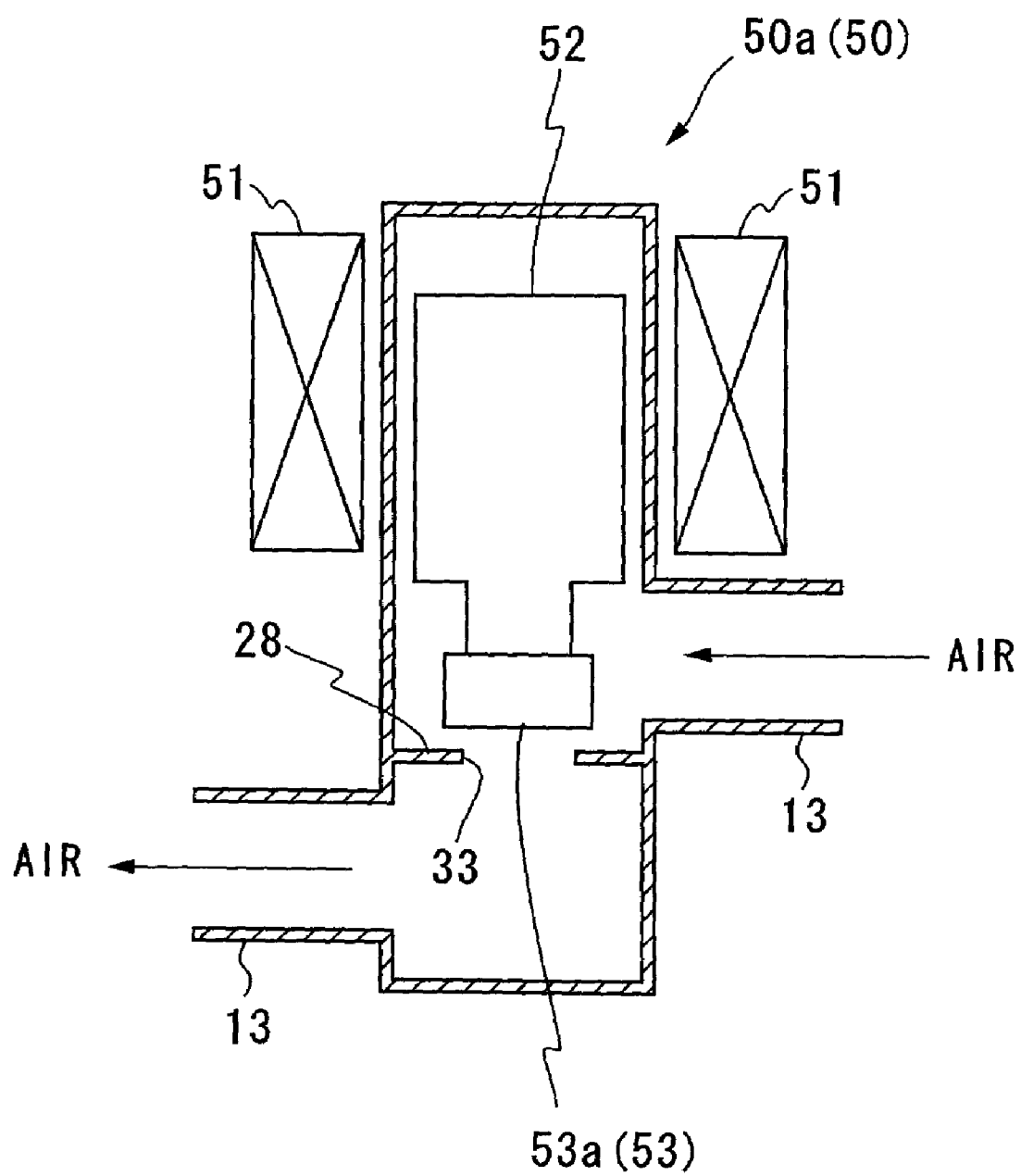
FIG. 11 is a cross-sectional view of a solenoid valve capable of regulating a reference pressure applied to the regulator shown in FIG. 1.

Moreover, as a device for regulating the reference pressure that is applied to the regulator 5, a solenoid valve may be used instead of the air injector 36. This is described with reference to FIG. 11 to FIG. 13. FIG. 11 is a cross-sectional view of a solenoid valve capable of regulating the reference pressure applied to the regulator shown in FIG. 1. As shown in the diagram, a circulation opening 33 is formed on a valve seat 28 of a solenoid valve 50a, and a valve 53a is disposed opposite the circulation opening 33. Furthermore, a plunger 52 is formed at the rear end of this valve 53a, and a solenoid coil 51 is disposed in front on the outside of this plunger 52. The plunger 52 is urged by a spring (not shown in the diagram) in the direction in which the valve 53a blocks the circulation opening 33. Furthermore, the solenoid coil 51 is controlled so that it is energized when air is introduced into the aforementioned air signal introduction passage 15.

Therefore, when the solenoid coil 51 is not energized, the circulation opening 33 makes contact with the valve 53a under the elastic force of the return spring so that air circulation in the solenoid valve 50a is blocked. Moreover, when the solenoid coil 51 is energized, the plunger 52 is shifted to the solenoid coil 51 side against the elastic force of the return spring, and the end part of the valve 53a becomes distanced from the circulation opening 33, so that circulation of the hydrogen gas in the solenoid valve 50a is permitted.

Figure 12:
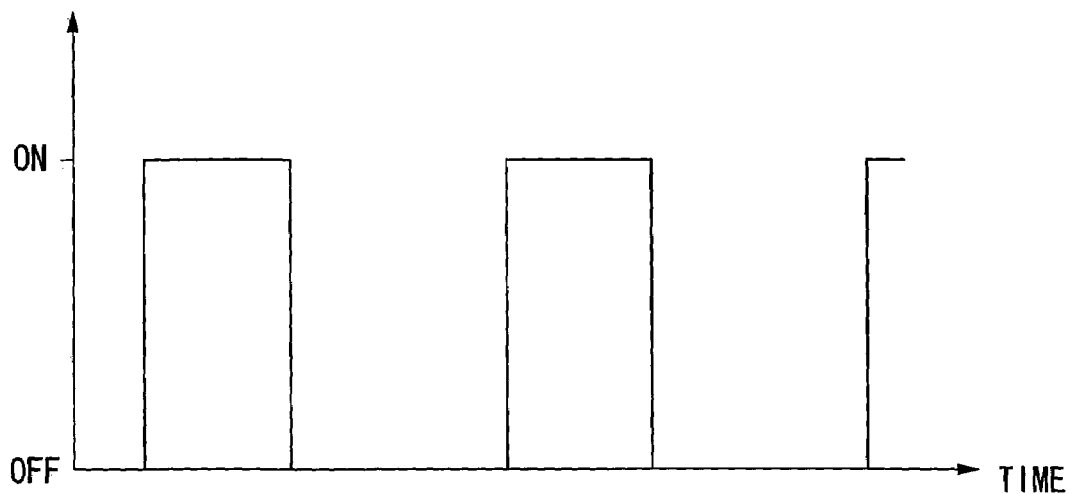
FIG. 12 is a graph showing time variance of ON-OFF control of the solenoid valve.

In this solenoid valve 50a, ON-OFF control is performed at predetermined intervals as shown in FIG. 12. The duty ratio of this ON-OFF control is controlled by the ECU 10, by monitoring the anode electrode pressure or the signal pressure, or pressures of both, on the upstream side of the fuel cell 1. As a result, the open valve time of the solenoid valve 50a is set. Thus, the signal pressure can be controlled using a simple control structure.

Also, by providing the orifice 34 on the upstream side of the air injector 36 in proximity to the air injector 36, the amount of air inflow to the air injector 36 with respect to the amount of air discharged from the air injector 36 is suppressed, so that pressure regulation can be stabilized regardless of the length of the route of the air signal introduction passage 15. Furthermore, the responsiveness of the pressure regulator with respect to fluctuations in the air amount can be improved.

Figure 13:
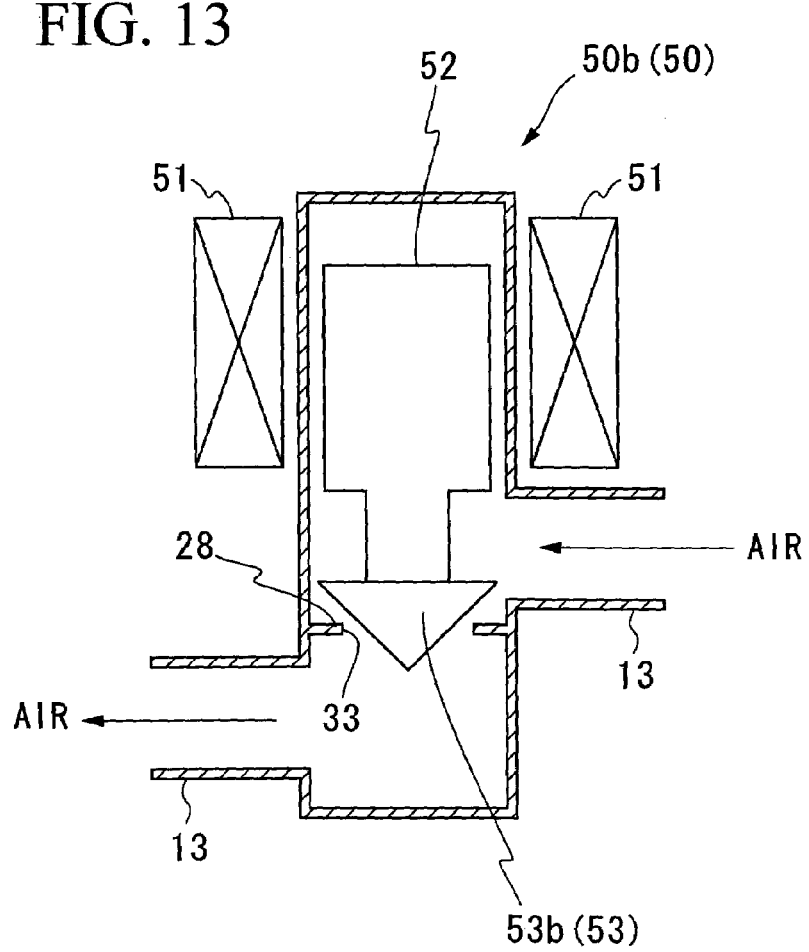
FIG. 13 is a cross-sectional view of a solenoid valve capable of regulating the reference pressure applied to the regulator shown in FIG. 1.

FIG. 13 is a cross-sectional view of another solenoid valve capable of regulating the reference pressure applied to the regulator shown in FIG. 1. The solenoid valve 50b shown in the diagram differs from the above mentioned solenoid valve 50b in that a needle 53b has a shape with a diameter reducing in the closing direction of the circulation opening 33. Thus, noise generated when the needle 53b is moved in the closing direction of the circulation opening 33, and the circulation opening 33 is shut, can be decreased. Moreover, since the gap between the needle 53b and the circulation opening 33 can be uniquely set by moving the needle 53b in the opening or closing direction of the circulation opening 33, pressure regulation can be uniquely regulated, so that pressure regulation can be performed with high accuracy.

According to the present invention, even in the case where the operating state of the fuel cell fluctuates, it is possible to regulate the reference pressure at the appropriate value, and responsiveness with respect to the required output can be improved.

According to the present invention, even in the case where atmospheric pressure fluctuates, the outlet pressure can be regulated to the predetermined value, and the regulating pressure applied to the regulator can be appropriately regulated.

According to the present invention, the amount of hydrogen that circulates through the ejector can be regulated to a proper amount, and the regulating pressure applied to the regulator can be appropriately regulated according to the switched diameter of the ejector.

According to the present invention, the regulating pressure applied to the regulator can be appropriately regulated.

According to the present invention, the amount of air inflow to the pressure regulator with respect to the amount of air discharged from the pressure regulator is suppressed, so that pressure regulation can be stabilized regardless of the length of the route of the air passage. Furthermore, the responsiveness of the pressure regulator with respect to fluctuations in the air amount can be improved.

According to the present invention, noise generated when moving the valve body in the closing direction of the circulation opening and shutting the circulation opening can be reduced, and pressure regulation can be carried out with high accuracy.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A reaction gas supply apparatus for a fuel cell comprising:
   a compressor that supplies pressurized air to a cathode electrode of a fuel cell;
   a hydrogen supply device that supplies hydrogen to an anode electrode of the fuel cell;
   a control device that controls said compressor according to an operating state of the fuel cell to regulate an air pressure of the cathode electrode;
   a regulator that is applied with the air pressure of said cathode electrode as a reference pressure, and regulates a supply pressure to said anode electrode based on said air pressure;
   an air injector that is capable of regulating the reference pressure that is applied to said regulator, by discharging air from an air flow passage for the air pressure that is applied to said regulator;
   a second air flow passage connected to said air flow passage;
   a regulator pressure sensor provided on said air flow passage; and
   an atmospheric pressure sensor; wherein
   said air flow passage has an orifice on an upstream side of said air injector and in proximity to said air injector;
   said regulator regulates an outlet pressure with respect to an applied regulating pressure to a predetermined value, with an atmospheric pressure as a reference;
   said second air flow passage branches from said air flow passage on a downstream side of said orifice and said regulator pressure sensor;

said air injector is provided on said second air flow passage;

said control device is connected at least to said regulator pressure sensor and said atmospheric pressure sensor and configured so as to control an opening of said air injector according to detection signals obtained from said regulator pressure sensor and said atmospheric pressure sensor; and a feedforward control amount of said opening of said air injector is calculated in accordance with the atmospheric pressure.

2. The reaction gas supply apparatus for a fuel cell according to claim 1, wherein said hydrogen supply device comprises a circulation passage that supplies hydrogen discharged from said anode electrode back to the anode electrode through an ejector;

said ejector has a hydrogen supply passage whose diameter is switchable in multiple stages; and the feedforward control amount of the opening of said air injector is calculated according to the diameter of said hydrogen supply passage of said ejector.

3. The reaction gas supply apparatus for a fuel cell according to claim 1, wherein a feedback control amount of the opening of said air injector is calculated according to an anode electrode target pressure, which is determined according to a target generated power of said fuel cell, and a detected anode electrode pressure.

4. The reaction gas supply apparatus for a fuel cell according to claim 1, wherein said air injector comprises a valve body that is capable of opening and closing a circulation opening that circulates the air to be supplied to said regulator; and said valve body is of a shape with a diameter reducing in a direction of closing said circulation opening.

5. A reaction gas supply method for a fuel cell comprising the steps of:

supplying pressurized air to a cathode electrode of a fuel cell with a compressor;

supplying hydrogen to an anode electrode of the fuel cell;

controlling said compressor according to an operating state of the fuel cell to regulate an air pressure of the cathode electrode;

applying a regulator with the air pressure of said cathode electrode as a reference pressure, and regulating a supply pressure to said anode electrode based on said air pressure using said regulator; and regulating the reference pressure that is applied to said regulator, by discharging air from an air flow passage for the air pressure that is applied to said regulator; wherein said regulating step of said reference pressure comprises using an air injector provided on a second air flow passage which branches from said air flow passage on a downstream side of an orifice and a regulator pressure sensor, so as to discharge air from said air flow passage;

an opening of said air injector is controlled according to a detection signal obtained from said regulator pressure sensor and an atmospheric pressure;

said orifice is provided on said air flow passage on an upstream side of said air injector and in proximity to said air injector;

said regulating step of the supply pressure to said anode electrode comprises regulating an outlet pressure of said regulator with respect to an applied regulating pressure to a predetermined value, with the atmospheric pressure as a reference; and said regulating step of the reference pressure comprises feedforward controlling an amount of air which is discharged from said air flow passage in accordance with the atmospheric pressure.

6. The reaction gas supply method for a fuel cell according to claim 5, wherein said supplying step of hydrogen comprises circulating hydrogen discharged from said anode electrode back to the anode electrode through an ejector, said ejector having a hydrogen supply passage whose diameter is switchable in multiple stages, and said regulating step of the reference pressure comprises feedforward controlling an amount of air which is discharged from said air flow passage according to the diameter of said hydrogen supply passage of said ejector.

7. The reaction gas supply method for a fuel cell according to claim 5, wherein said regulating step of the reference pressure comprises feedforward controlling an amount of air which is discharged from said air flow passage according to an anode electrode target pressure, which is determined according to a target generated power of said fuel cell, and a detected anode electrode pressure.

8. The reaction gas supply method for a fuel cell according to claim 5, wherein said regulating step of the reference pressure comprises using said air injector for discharging air from said air flow passage, said air injector comprising a valve body that is capable of opening and closing a circulation opening that circulates the air to be supplied to said regulator, said valve body being of a shape with a diameter reducing in a direction of closing said circulation opening.

* * * * *